Dec. 4, 1923.
C. G. STRANDLUND
CLAMP FOR CULTIVATOR TOOL SHANKS
Filed Nov. 8, 1922
1,476,551
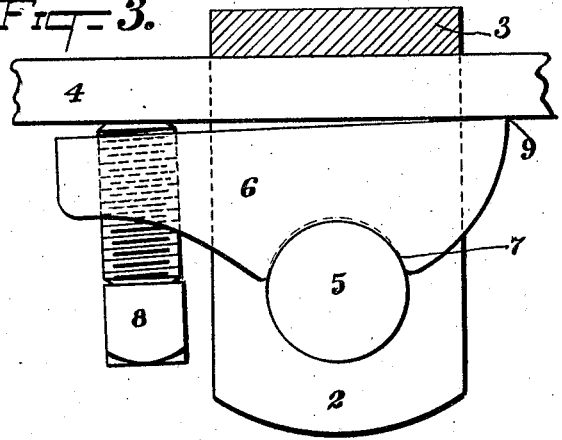
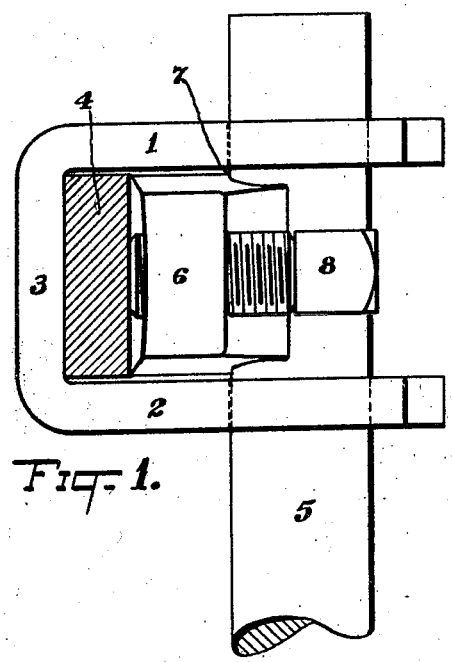
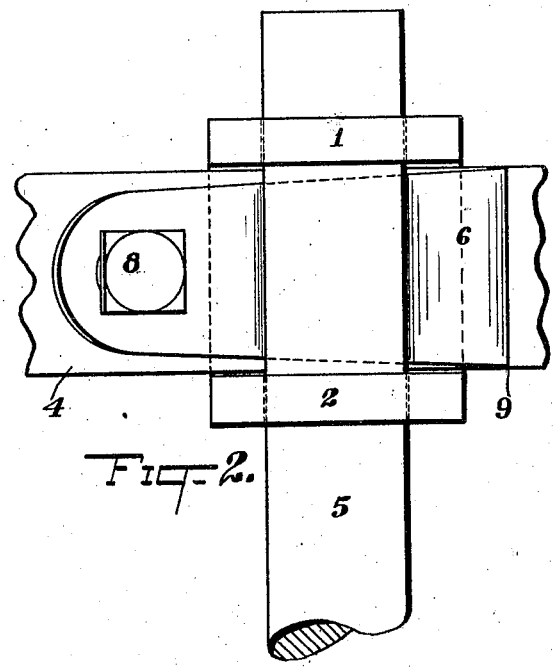

Patented Dec. 4, 1923.

1,476,551

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

CLAMP FOR CULTIVATOR-TOOL SHANKS.

Application filed November 8, 1922. Serial No. 599,684.

*To all whom it may concern:*

Be it known that I, CARL G. STRANDLUND, a citizen of the United States, residing at Moline, in the county of Rock Island and State of Illinois, have invented certain new and useful Improvements in Clamps for Cultivator-Tool Shanks, of which the following is a specification, reference being had therein to the accompanying drawing.

My invention relates to clamps for holding shanks of earth stirring devices in position on the beams of cultivators, which are readily movable to secure the shanks and tools at any desired position on the beams; and it is an object of my invention to provide a device of this type by which a tool shank can be rigidly secured in place, and at the same time be readily loosened for adjustment along the beam or for vertical adjustment as may be desired.

Referring to the drawings in which similar numerals indicate identical parts—

Figure 1 is a side elevation of my device as applied to a cultivator beam. Figure 2 is a front elevation of Figure 1, and Figure 3 is a plan in part section.

The clamp includes a U-shaped body having parallel arms 1 and 2 integral with a back 3 contacting snugly with a beam 4 of a cultivator. The arms 1 and 2 are apertured to receive the shank 5 which is held rigidly therein by pressure of a block 6, the latter having a flat side, which contacts with the beam 4, and a groove 7 to fit the shank 5. The block 6 functions to hold the shank in any position of adjustment by operation of a set screw 8 which extends through a threaded aperture in one end of the block 6 and contacts with the beam 4.

The block 6 operates between the arms 1 and 2, and is positioned between the back 3 and the shank 5 with its fulcrum at 9 on the beam 4, and it is of sufficient length to provide the leverage which is exercised by operation of the set screw 8 against the beam 4 to hold the shank 5 rigidly in place. When it is desired to shift the clamp and shank 5 along the beam 4 the set screw 8 is turned until the pressure of the block 6 against the beam 4 and the shank 5 is relieved and the parts are loose; when the desired adjustment has been accomplished the set screw 8 is turned in the opposite direction to secure the parts rigidly together, and the same operation of loosening the parts is performed to adjust the shank vertically.

What I claim is—

1. The combination with a beam, of a clamp of the character described, comprising a body portion having parallel arms and a back in contact with the beam, openings in said arms to receive the shank of a cultivator tool, a block between the beam and the shank, said block fulcrumed at one end on the beam, and a set screw in the other end of said block and operative against the beam to swing said block against the shank.

2. The combination with a beam, of a clamp of the character described, comprising a body portion having a back to contact with the beam and parallel arms extending respectively above and below the beam, openings in said arms to receive the shank of a cultivator tool, a block between the beam and the shank having a groove intermediate its ends to accommodate the shank, said block fulcrumed at one end on the beam, and a set screw in the other end of said block operative against the beam to swing said block against the shank.

3. The combination with a beam, of a clamp of the character described, comprising a body portion having a back to fit against the beam, parallel arms integral with said back and extending respectively above and below the beam transversely thereof, openings in said arms to receive the shank of a cultivator tool, a block between the beam and the shank having a groove intermediate its ends to accommodate the shank, said block fulcrumed at one end on the beam, and a set screw in the other end of the block operative against the beam to swing said block against the shank.

CARL G. STRANDLUND.